US007693088B2

(12) United States Patent
Daugherty et al.

(10) Patent No.: US 7,693,088 B2
(45) Date of Patent: Apr. 6, 2010

(54) METHOD AND APPARATUS FOR DATA RATE DETECTION USING A DATA EYE MONITOR

(75) Inventors: Dwight D. Daugherty, Ephrata, PA (US); Mohammad S. Mobin, Orefield, PA (US); Gregory W. Sheets, Breinigsville, PA (US); Lane A. Smith, Easton, PA (US); Paul H. Tracy, Schnecksville, PA (US)

(73) Assignee: Agere Systems Inc., Allentown, PA (US)

( * ) Notice: Subject to any disclaimer, the term of this patent is extended or adjusted under 35 U.S.C. 154(b) by 280 days.

(21) Appl. No.: 11/686,144

(22) Filed: Mar. 14, 2007

(65) Prior Publication Data
US 2008/0225734 A1 Sep. 18, 2008

(51) Int. Cl.
*H04L 12/26* (2006.01)
*H04J 3/06* (2006.01)
*H04B 17/00* (2006.01)

(52) U.S. Cl. ............... 370/253; 370/503; 375/225
(58) Field of Classification Search .................. None
See application file for complete search history.

(56) References Cited

U.S. PATENT DOCUMENTS

| 5,333,147 | A | * | 7/1994 | Nohara et al. ............... 375/224 |
| 5,533,072 | A | * | 7/1996 | Georgiou et al. ............ 375/371 |
| 5,654,987 | A | * | 8/1997 | Nakamura .................. 375/355 |
| 6,278,755 | B1 | * | 8/2001 | Baba et al. .................. 375/360 |
| 6,347,128 | B1 | * | 2/2002 | Ransijn ....................... 375/376 |
| 7,194,045 | B2 | * | 3/2007 | Duda et al. .................. 375/326 |
| 2002/0085656 | A1 | * | 7/2002 | Lee et al. ..................... 375/355 |
| 2004/0066867 | A1 |   | 4/2004 | Fujimori et al. |
| 2004/0125874 | A1 |   | 7/2004 | Baumert |
| 2006/0109940 | A1 | * | 5/2006 | Beukema et al. ............ 375/350 |
| 2006/0140321 | A1 | * | 6/2006 | Tell et al. .................... 375/376 |
| 2007/0025483 | A1 | * | 2/2007 | Emami-Neyestanak et al. ............................ 375/355 |
| 2007/0064848 | A1 | * | 3/2007 | Desai ......................... 375/355 |
| 2007/0133726 | A1 | * | 6/2007 | Nadig et al. ................ 375/360 |
| 2007/0147569 | A1 | * | 6/2007 | Chang et al. ................ 375/373 |
| 2007/0268962 | A1 | * | 11/2007 | Mobin et al. ............... 375/224 |
| 2007/0280392 | A1 | * | 12/2007 | De Laurentiis et al. ...... 375/355 |
| 2008/0080649 | A1 | * | 4/2008 | Gibbons et al. ............. 375/355 |
| 2008/0285443 | A1 | * | 11/2008 | Connolly et al. ............ 370/229 |

OTHER PUBLICATIONS

Gibilisco, Stan, The Illustrated Dictionary of Eletronics, 2001, McGraw-Hill, pp. 28-29.*

* cited by examiner

*Primary Examiner*—Chi H. Pham
*Assistant Examiner*—Warner Wong
(74) *Attorney, Agent, or Firm*—Ryan, Mason & Lewis, LLP

(57) ABSTRACT

Methods and apparatus are provided for data rate detection using a data eye monitor. The data rate is one of a plurality of data rates comprising a base rate and one or more divide-by-N multiples of the base rate, where N is an integer. The data rate of a received signal is detected by sampling the received signal; comparing the samples for a plurality of full rate data eyes associated with the received signal to determine if there is a mismatch between at least two predefined samples; and detecting the data rate by evaluating the comparison based on predefined criteria. The comparison can be performed by an exclusive or (XOR) logic gate for samples of at least two adjacent data eyes of a given rate.

22 Claims, 6 Drawing Sheets

US 7,693,088 B2

1

METHOD AND APPARATUS FOR DATA RATE DETECTION USING A DATA EYE MONITOR

FIELD OF THE INVENTION

The present invention relates to communication systems, and more particularly, to methods and apparatus for determining the data rate in a communication system

BACKGROUND OF THE INVENTION

Communication networks are increasingly required to carry information at various data rates. The selected data rate for a given communication can be pre-established between the transmitter and receiver, can be signaled, for example, using handshaking techniques, or can be dynamically determined by the receiver. A static rate mechanism does not offer the flexibility required by most applications, and a signaling technique increases the acquisition latency.

A number of techniques have thus been proposed or suggested for automatic data rate detection. Such data rate detection techniques allow a receiver to determine the rate of incoming data, for example, by examining the received data. Such automatic data rate detection techniques allow a receiver to receive data from a variety of transmitting devices operating at different speeds without having to establish data rates in advance.

A need exists for improved methods and apparatus for determining the data rate of a received signal in a communication receiver. A further need exists for communications networks that support multiple data rates and dynamic data rate switching. Yet another need exists for communications networks that provide data rate detection in the physical layer using non-invasive data monitoring.

SUMMARY OF THE INVENTION

Generally, methods and apparatus are provided for data rate detection using a data eye monitor. The data rate is one of a plurality of data rates comprising a base rate and one or more divide-by-N multiples of the base rate, where N is an integer. For example, a multi-rate communication system may support a full data rate, a half data rate (N=2), a quarter data rate (N=4), and an octal data rate N=8).

According to one exemplary aspect of the invention, the data rate of a received signal is detected by sampling the received signal; comparing the samples for a plurality of full rate data eyes associated with the received signal to determine if there is a mismatch between at least two predefined samples; and detecting the data rate by evaluating the comparison based on predefined criteria. The comparison can be performed by an exclusive or (XOR) logic gate for samples of at least two adjacent data eyes of a given rate.

For example, when the data rate is a full data rate, the comparison determines if there is a mismatch in the sampled values associated with two adjacent full rate data eyes. Likewise, when the data rate is a half data rate, the comparison determines if there is a mismatch in the sampled values associated with two alternate full rate data eyes. When the data rate is a quarter data rate, the comparison determines if there is a mismatch in the sampled values associated with full rate data eyes having a separation of four. When the data rate is an octal data rate, the comparison determines if there is a mismatch in the sampled values associated with full rate data eyes having a separation of eight.

A more complete understanding of the present invention, as well as further features and advantages of the present invention, will be obtained by reference to the following detailed description and drawings.

DETAILED DESCRIPTION

Figure 1:
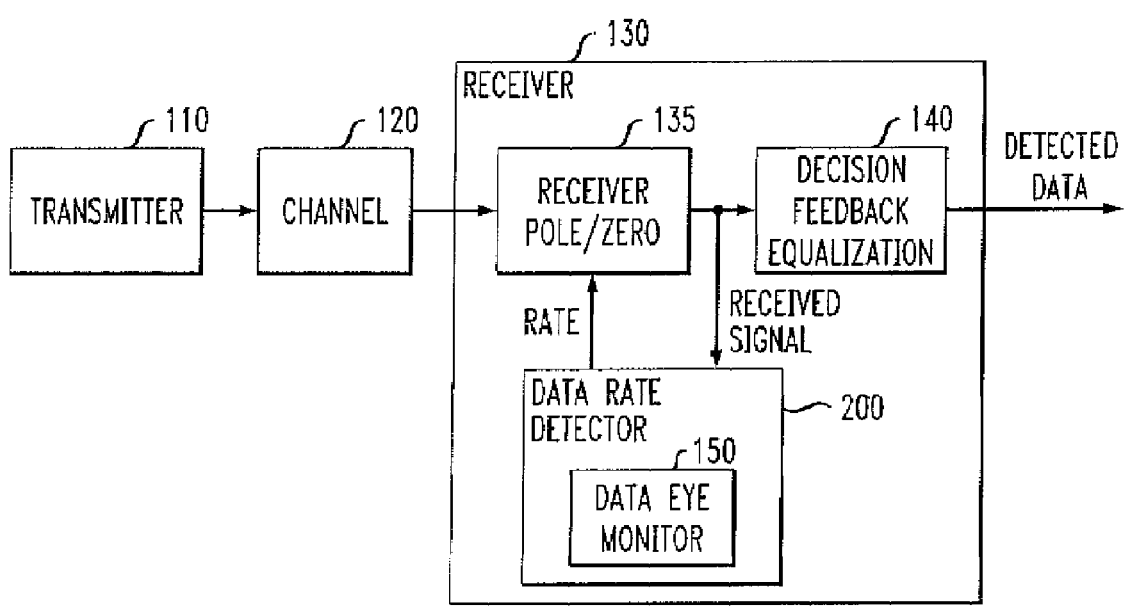
FIG. 1 is a block diagram of a communication system in which the present invention can be implemented.

The present invention provides methods and apparatus for data-rate detection in the physical layer. The disclosed techniques process data that has been locked by a clock and data recovery (CDR) system or timing recovery loop to detect the rate of the received data. FIG. 1 is a block diagram of a communication system 100. As shown in FIG. 1, a transmitter 110 transmits data over a channel 120 for receipt by a receiver 130. As previously indicated, it is often desirable fox a communication system 100 to support multiple data rates. Typically, a multi-rate communication system 100 employs one of a plurality of data rates when transmitting data, comprising a base rate and one or more divide-by-N multiples of the base rate, where N is an integer For example, the SerDes circuit model SDM8G09, commercially available from Agere Systems Inc. of Allentown, Pa., supports a full data rate of 8 Gbps, a half data rate of 4 Gbps (N=2), a quarter data rate of 2 Gbps (N=4), and an octal data rate of 1 Gbps (N=8) (although it does not perform data-rate detection in the physical layer in accordance with the present invention). Pre-emphasis techniques (not shown) are optionally applied in the transmitter before the signal is transmitted over the channel 120. In addition, equalization techniques 135, such as zero equalization 135 and decision feedback equalization (DFE) 140 are optionally applied in the receiver 130.

According to one aspect of the invention, the receiver 130 includes a data rate detector 200, discussed further below in conjunction with FIG. 2, to automatically determine the rate of the received signal. As shown in FIG. 1 and discussed further below, the disclosed rate identification techniques are based on a latch-based data eye monitor 150 that provides data transition statistics. In particular, since the data eye monitor 150 has the visibility of the physical layer data, the data eye monitor 150 can exploit the data transition history to determine the data rate. For a discussion of a suitable data eye monitor 150, see, for example, U.S. patent application Ser. No. 11/095,178, entitled "Method and Apparatus for Monitoring a Data Eye In a Clock and Data Recovery System," incorporated by reference herein.

Full Rate Detection

Figure 2:
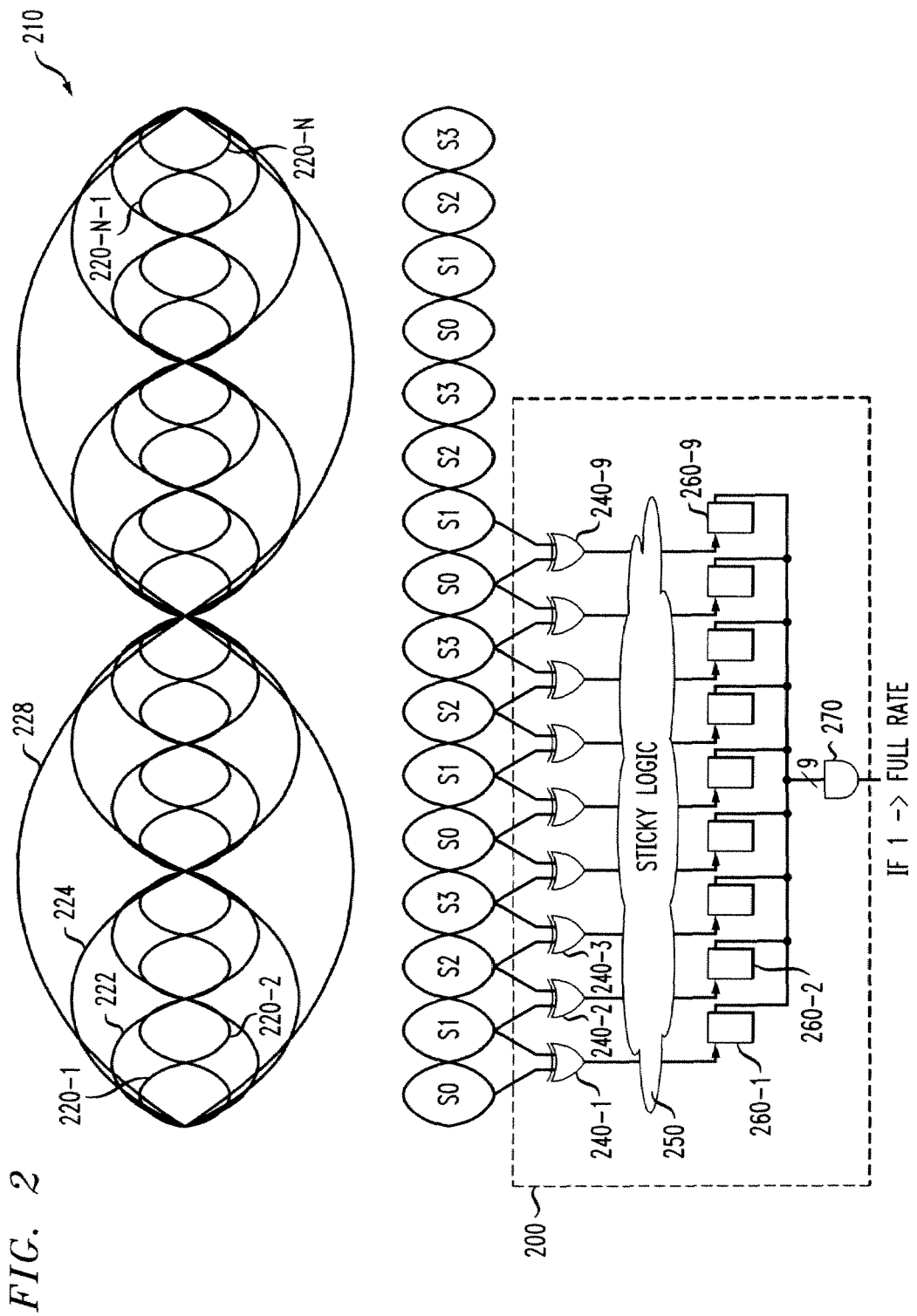
FIG. 2 is a schematic diagram of a data rate detector that incorporates features of the present invention to identify data that has been transmitted at the full rate.

FIG. 2 is a schematic diagram of a full rate detector 200 that incorporates features of the present invention to identify data that has been transmitted at the full rate FIG. 2 graphically illustrates a received signal 210. It is noted that the signal 210 is shown as a series of full rate data eyes 220-1 through 220-N, as well as lower rate data eyes 222, 224, 228. Each data eye 220, 222, 224, 228 is a superposition of a number of individual signals, super imposed M eyes at a time from a continuous stream of input eyes.

The present invention recognizes that the data rate can be detected by analyzing the data pattern of the received data. The top portion of FIG. 2 illustrates the data eyes 220, 222, 224, 228 associated with each of the plurality of data rates in the multi-rate system 100. The exemplary system includes full-rate data eyes 220, half-rate data eyes 222, quarter rate data eyes 224, and octal rate data eyes 228. For example, for a half rate signal, a data signal is repeated across two full rate time intervals and each half-rate data eye 222 has a duration of two adjacent full-rate data eyes 220. Thus, for a half rate signal (N=2), it is expected that every two adjacent full rate data eyes 220 will consistently be the same value. Similarly, for a quarter rate signal, a data signal is repeated across four full rate time intervals and each quarter rate data eye 224 has a duration of four adjacent full-rate data eyes 220. Thus, for a quarter rate signal (N=4), it is expected that every four adjacent full rate data eyes 220 will consistently be the same value. It is noted that for a full rate signal (N=1), each full rate data eye 220 is independent and significant variation will be expected for each data eye 220. In general, for a 1/N rate signal, a data signal is repeated across N full rate time intervals and each 1/N-rate data eye has a duration of N adjacent full-rate data eyes 220.

The various data eyes 220, 222, 224, 228 shown in FIG. 2 illustrate one possible phase relationship among the various data rates. It is noted, however, that in general a 1/N rate signal has N possible different phase relationships with the full rate signal. For example, for a half rate signal, each half-rate data eye 222 has a duration of two adjacent full-rate data eyes 220. It is unknown, however, whether the start of the half rate data eye 222 is aligned with the first or second of the two adjacent full rate data eyes 220. In other words, the starting point for the half rate signal can be at the boundary of one of two different full rate data eyes 220. Likewise, for a quarter rate signal, each quarter rate data eye 224 has a duration of four adjacent full-rate data eyes 220 and the start of the quarter rate data eye 224 can be any one of four adjacent full-rate data eyes 220. As discussed further below, the clock and data recovery system knows which of the possible phase relationships for a given rate is valid. The clock and data recovery system has already locked to one of the phase relationships and this information can be used to select the appropriate phase to be employed for rate detection.

According to a further aspect of the invention, the full rate detector 200 includes circuitry to monitor the data transition statistics to determine the data rate of the received signal. Thus, as shown in FIG. 2, the received signal 210 is sampled by one or more sample latches $S_n$ to determine the sampled values. Generally, a plurality of samples of the received signal are taken, and only the samples that satisfy predefined reliability criteria are processed to determine the data rate. For example, the samples associated with a center region of the data eye for a given rate may be processed. In the exemplary embodiment, a "data window" comprises four full rate data eyes 220. In a further variation, the sampling latches may be offset from a central region for improved reliability (for example, in the presence of inter-symbol interference), using known DFE techniques. It is further noted that the sample latches, $S_n$, can be redefined in real-time by the clock and data recovery system as transition latches, $T_n$, and vice versa.

It is noted that to detect a full rate signal, only the samples associated with two adjacent full rate data eyes 220 need to be processed, but processing additional samples in the manner shown in FIG. 2 provides additional reliability. When the data rate is a full data rate, the full rate detector 200 determines if there is a mismatch in the sampled values associated with two adjacent full rate data eyes. In the exemplary embodiment shown in FIG. 2, there are four sampling latches S0 through S3 that sample the received signal 210 over time. To evaluate a time duration comprised of eight full rate data eyes, the four sampling latches S0 through S3 are evaluated for two consecutive time intervals.

As shown in FIG. 2, for a full rate data rate detector 200, the outputs of the four latches S0 through S3 for two consecutive time intervals are processed to determine if there is a mismatch in the sampled values associated with two adjacent latches $S_n$. In one exemplary implementation, the outputs of the four latches S0 through S3 for two consecutive time intervals are applied to an exclusive OR (XOR) gate 240 to determine if there is a mismatch in the sampled values associated with two adjacent latches $S_n$. For example, XOR gate 240-1 processes the samples generated by latches S0 and S1 to determine if there is a mismatch in the sampled values associated with the two adjacent latches S0 and S1. The output of a given XOR gate 240 will be a logic value of one if the two inputs are not the same (i.e., do not match).

The output of the XOR gates 240 are each applied to corresponding sticky logic (registers) 250. Generally, a sticky register, once set to a logic value of one at any time, will maintain the value of one until reset.

As indicated above, for a full rate signal, each full rate data eye 220 is independent and significant variation will be expected for each data eye 220. Thus, for a full rate signal, it will be expected that eventually each of the adjacent samples will not match, and at some point, each of the XOR gates will generate a logic value of one (provided sufficient data statistics are processed). Thus, the sticky register 250 associated with each XOR gate 240 will have a value of one, which is stored by an associated register 260 (or a latch).

The outputs of the registers 260 are processed by an AND gate 270. The output of the AND gate 270 will have a logic value of one if all of the registers have a logic value of one (indicating that at some point each of the adjacent data eyes exhibited a mismatch). A "full rate" condition is asserted by the full rate detector 200 whenever the output of the AND gate 270 is a logic value of one.

Half Rate Detection

As previously indicated, fox a half rate signal, a data signal is repeated across two adjacent full rate data eyes 220. Thus, for a half rate signal, it is expected that every two adjacent full rate data eyes 220 will consistently be the same value. Typically, a half rate signal is detected based on the output of a transition latch ($T_n$) that is positioned between each of the sample latches (S0 through S3) shown in FIG. 2, since the signal has the same value for two full-rate data eyes 220 and the approximate midpoint of the two full-rate data eyes is typically a reliable sampling region. Alternatively, as indicated above, the transition latches, $T_n$, can be redefined in real-time by the clock and data recovery system as the sample latches, $S_n$, and vice versa. In which case, the sample latches, $S_n$, will be the approximate mid-point of the half rate data eye 222.

If the full rate detection is negative, the half rate detector 300 is evaluated. As previously indicated, transition of half rate data can have two phase possibilities in relation to the full data rate (e.g., the start of a half rate data eye 222 can be phase aligned with the first or second full rate data eye 220). Thus, there are two possible implementations, shown in FIGS. 3 and 4. If either circuit 300, 400 generates a logic value of one, the rate is determined to be "Half Rate." The clock and data recovery system knows which of the two possible phase relationships is valid. The clock and data recovery system has already locked to one of the phase relationships and this information can be used to select the appropriate one of half rate detector circuits 300 or 400.

As indicated above, for half rate data, two adjacent half-rate data eyes 222 are compared. With respect to the full rate data, the half rate boundary may be on the first or second full rate data eye. Thus, the XOR gates 340 compare the samples the latches associated with T1 and T3 (or alternatively, S1/S3 if the sample and transition latches have been redefined by the clock and data recovery system). As discussed further below in conjunction with FIG. 4, for the other possible half rate phase relationship, the XOR gates 440 compare the samples the latches associated with T0 and T2 (or alternatively, S0/S2 if the sample and transition latches have been redefined by the clock and data recovery system).

Figure 3:
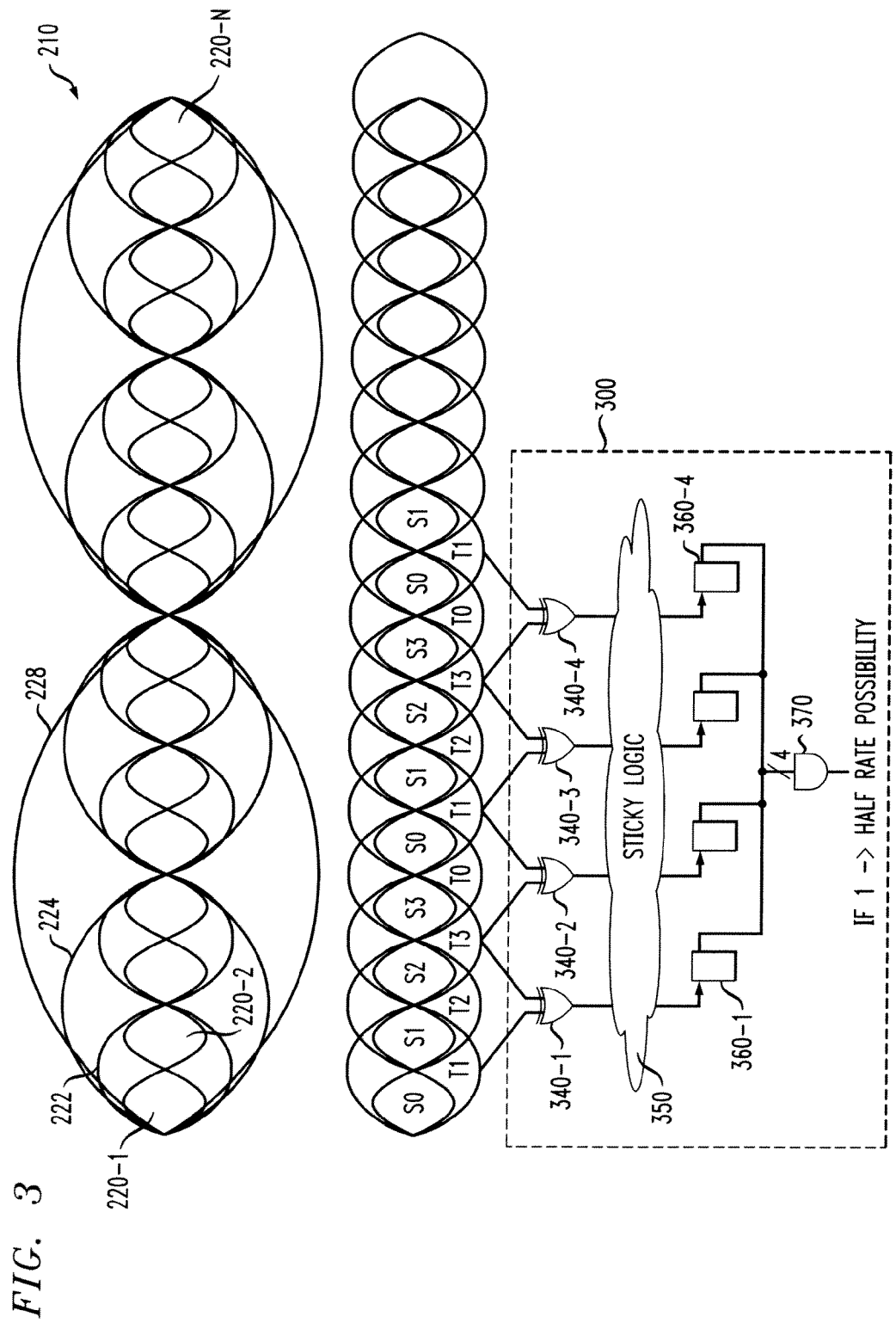
FIGS. 3 and 4 are schematic diagrams of a data rate detector that incorporates features of the present invention to identify data that has been transmitted at the half rate for two different phase relationships, relative to the full rate data.

FIG. 3 is a schematic diagram of a first half rate detector 300 that incorporates features of the present invention to identify data that has been transmitted at the half rate. FIG. 3 graphically illustrates the received signal 210. It is again noted that the signal 210 is shown as a series of data eyes 220, 222, 224, 228, associated with full rate, half rate, quarter rate and octal rate, respectively. The half rate detector 300 detects when the data has been transmitted at the half rate, for the first possible half rate phase relationship.

In the first half rate detection circuit 300, transition latches T1 and T3 are compared (or alternatively, sample latches S1 and S3, if the transition and sample latches have been redefined by the clock and data recovery system). Thus, as shown in FIG. 3, the received signal 210 is sampled by transition latches T1 and T3 between each half rate data eye 222 for a half rate detector 300, the outputs of alternating latches T1 and T3 for two consecutive time intervals are processed to determine it there is a mismatch in the sampled values associated with two alternate transition latches $T_n$. The outputs of the alternate transition latches T1 and T3 for two consecutive time intervals are applied to an exclusive OR (XOR) gate 340 to determine if there is a mismatch in the sampled values associated with two alternate latches $T_n$. Thus, XOR gate 340-1 processes the samples generated by transition latches T1 and T3 to determine it there is a mismatch in the sampled values associated with the two alternate latches T1 and T3. The output of a given XOR gate 340 will be a logic value of one if the two inputs are not the same (i.e., do not match) at a given time when the statistics were collected.

The output of the XOR gates 340 are each applied to corresponding sticky logic (registers) 350. As indicated above, for a half rate signal (N=2), it is expected that every two adjacent data eyes 220 will consistently be the same value. Thus, for a half rate signal, it will be expected that eventually each of the alternate samples will not match, and at some point each of the XOR gates will generate a logic value of one. Thus, the sticky register 350 associated with each XOR gate 340 will have a value of one, which is stored by an associated register 360 (or latch).

The outputs of the registers 360 are processed by an AND gate 370. The output of the AND gate 370 will have a logic value of one if all of the registers have a logic value of one (indicating that at some point each of the adjacent data eyes exhibited a mismatch). A "possible half rate" condition is asserted by the data rate detector 300 whenever the output of the AND gate 370 is a logic value of one.

Figure 4:
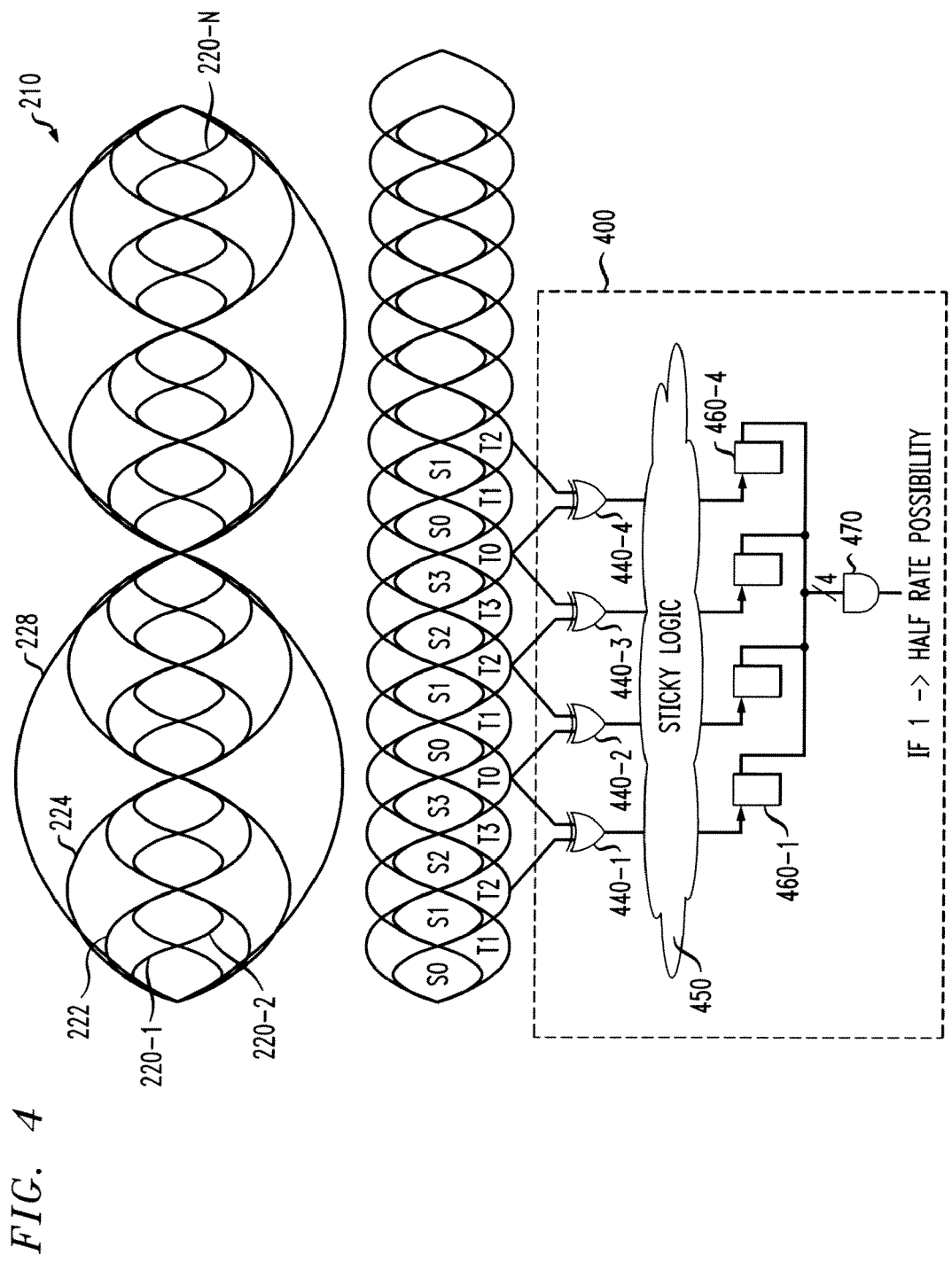

FIG. 4 is a schematic diagram of a second half rate detector 400 that incorporates features of the present invention to identify data that has been transmitted at the second possible phase for half rate data. FIG. 4 graphically illustrates the received signal 210 having a series of data eyes 220, 222, 224, 228, associated with full rate, half rate, quarter rate and octal rate, respectively. The half rate detector 400 detects when the data has been transmitted at the half rate, for the second possible half rate phase relationship.

In the second half rate detection circuit 400, transition latches T0 and T2 are compared (or alternatively, sample latches S0 and S2, if the transition and sample latches have been redefined by the clock and data recovery system). Thus, as shown in FIG. 4, the received signal 210 is sampled by transition latches T0 and T2 between each half rate data eye 222. For a half rate detector 400, the outputs of alternating latches T0 and T2 for two consecutive time intervals are processed to determine if there is a mismatch in the sampled values associated with two alternate transition latches $T_n$.

In the exemplary embodiment, XOR gate 440-1 processes the samples generated by transition latches T0 and T2 to determine if there is a mismatch in the sampled values associated with the two alternate latches T0 and T2. The output of a given XOR gate 440 will be a logic value of one if the two inputs are not the same (i.e., do not match).

The output of the XOR gates 440 are each applied to corresponding sticky logic (registers) 450. As indicated above, for a half rate signal (N=2), it is expected that every two adjacent full rate data eyes 220 will consistently be the same value. Thus, for a half rate signal, it will be expected that eventually each of the alternate samples will not match, and at some point, each of the XOR gates will generate a logic value of one. Thus, the sticky register 450 associated with each XOR gate 440 will have a value of one, which is stored by an associated register 460 (or latch).

The outputs of the registers 460 are processed by an AND gate 470. The output of the AND gate 470 will have a logic value of one if all of the registers have a logic value of one (indicating that at some point each of the adjacent data eyes exhibited a mismatch). A "possible half rate" condition is asserted by the half rate detector 400 whenever the output of the AND gate 470 is a logic value of one. A half rate condition is asserted if the appropriate circuit is 300 or 400, based on the current phase relationship, generates an output of one.

Quarter Rate Detection

For a quarter rate signal (N=4), a data signal is repeated across four adjacent full rate data eyes 220. Thus, for a quarter rate signal, it is expected that every four adjacent full rate data eyes 220 will consistently be the same value. Typically, a quarter rate signal is detected based on the output of a transition latch ($T_n$) that is positioned between each of the sample latches (S0 through S3) shown in FIG. 2, since the signal has the same value for four full rate data eyes and the approximate midpoint of the four full-rate data eyes is typically a reliable sampling region. Alternatively, as indicated above, the transition latches, $T_n$, can be redefined in real-time by the clock and data recovery system as the sample latches, $S_n$, and vice versa. In which case, the sample latches, $S_n$, will be the approximate mid-point of the quarter rate data eyes 224.

Figure 5:
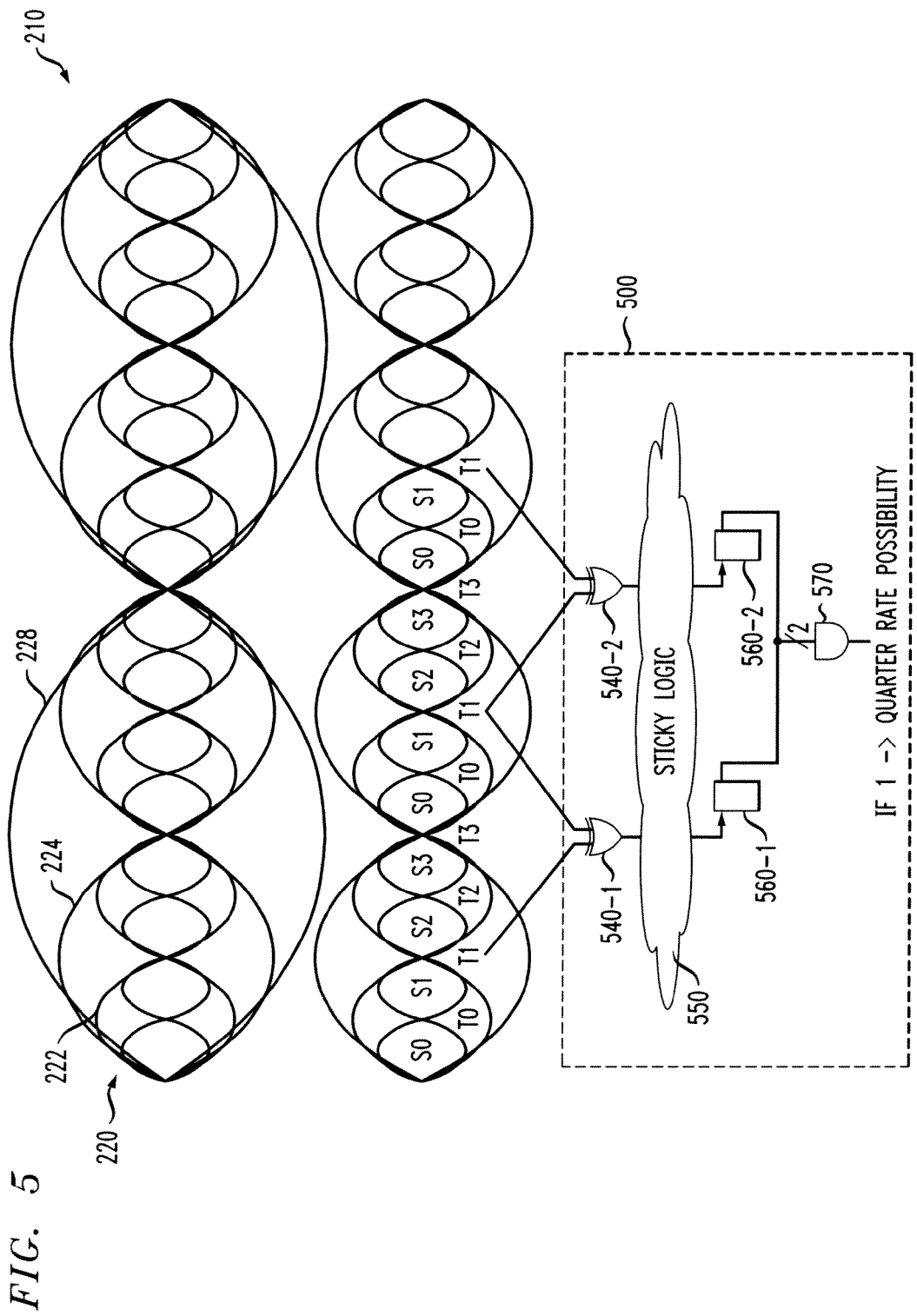
FIG. 5 is a schematic diagram of a data rate detector that incorporates features of the present invention to identify data that has been transmitted at the quarter rate.

If the full and half rate detection are negative, the quarter rate detector circuit 500 is evaluated. As indicated above, the phase transition of quarter rate data can have four possibilities in relation to the full data rate. Thus, there are four possible circuit implementations. One exemplary quarter rate detection circuit 500 is shown in FIG. 5. The other three implementations would be apparent to a person of ordinary skill. If the appropriate quarter rate circuit generates a logic value of one, the rate is determined to be "Quartet Rate."

FIG. 5 is a schematic diagram of a first quarter rate detector 500 that incorporates features of the present invention to identify data that has been transmitted at the quarter rate (N=4) FIG. 5 graphically illustrates the received signal 210 having a series of data eyes 220, 222, 224, 228, associated with full rate, half rate, quarter rate and octal rate, respectively. The quarter rate detector 500 detects when the data has been transmitted at the quarter rate, for one of the possible phase relationships.

As shown in FIG. 5, the received signal 210 is sampled by latches in the approximate center of each quarter rate data eye 224. For a quarter rate detector 500, the outputs of every fourth latch among the latches T0 through T3 for two consecutive time intervals are processed to determine if there is a mismatch in the sampled values associated with the appropriate transition latches $T_n$. In the exemplary implementation, each transition latch for a given time interval is compared to itself for the next time interval. The outputs of the transition latch $T_n$ for two consecutive time intervals are applied to an exclusive OR (XOR) gate 540 to determine if there is a mismatch in the sampled values associated with the latch $T_n$. In the first quarter rate detection circuit 500 shown in FIG. 5, transition latch T1 is compared to itself for two consecutive time intervals. Thus, XOR gate 540-1 and 540-2 process the samples generated by transition latch T1 to determine if there is a mismatch in the sampled values associated with the latch T1 for subsequent time intervals. The output of a given XOR gate 540 will be a logic value of one if the two inputs are not the same (i.e., do not match).

The output of the XOR gates 540 are each applied to corresponding sticky logic (registers) 550. As indicated above, for a quarter rate signal (N=4), it is expected that every four adjacent data eyes 220 will consistently be the same value. Thus, for a quarter rate signal, it will be expected that eventually every fourth sample will not match, and at some point, each of the XOR gates will generate a logic value of one. Thus, the sticky register 550 associated with each XOR gate 540 will have a value of one, which is stored by an associated register 560 (or latch).

The outputs of the registers 560 are processed by an AND gate 570. The output of the AND gate 570 will have a logic value of one if all of the registers have a logic value of one (indicating that at some point each of the adjacent data eyes exhibited a mismatch). A "possible quarter rate" condition is asserted by the data rate detector 500 whenever the output of the AND gate 570 is a logic value of one. A quartet rate condition is asserted if the appropriate quarter rate circuit 500, based on the current phase relationship, generates an output of one. The other three phase combinations compare the value of T0, T2 and T3 for a for a first time interval to the corresponding value of T0, T2 and T3 for the next time interval Octal Data Rate For an octal rate signal (N=8), a data signal is repeated across eight adjacent full rate data eyes 220. Thus, for an octal rate signal, it is expected that every eight adjacent full rate data eyes 220 will consistently be the same value. Typically, an octal rate signal is detected based on the output of a transition latch ($T_n$) that is positioned between each of the sample latches (S0 through S3) shown in FIG. 2, since the signal has the same value for eight full rate data eyes and the approximate midpoint of the eight full-rate data eyes is typically a reliable sampling region. Alternatively, as indicated above, the transition latches, $T_n$, can be redefined in real-time by the clock and data recovery system as the sample latches, $S_n$, and vice versa. In which case, the sample latches, $S_n$, will be the approximate mid-point of the octal rate data eyes 228.

Figure 6:
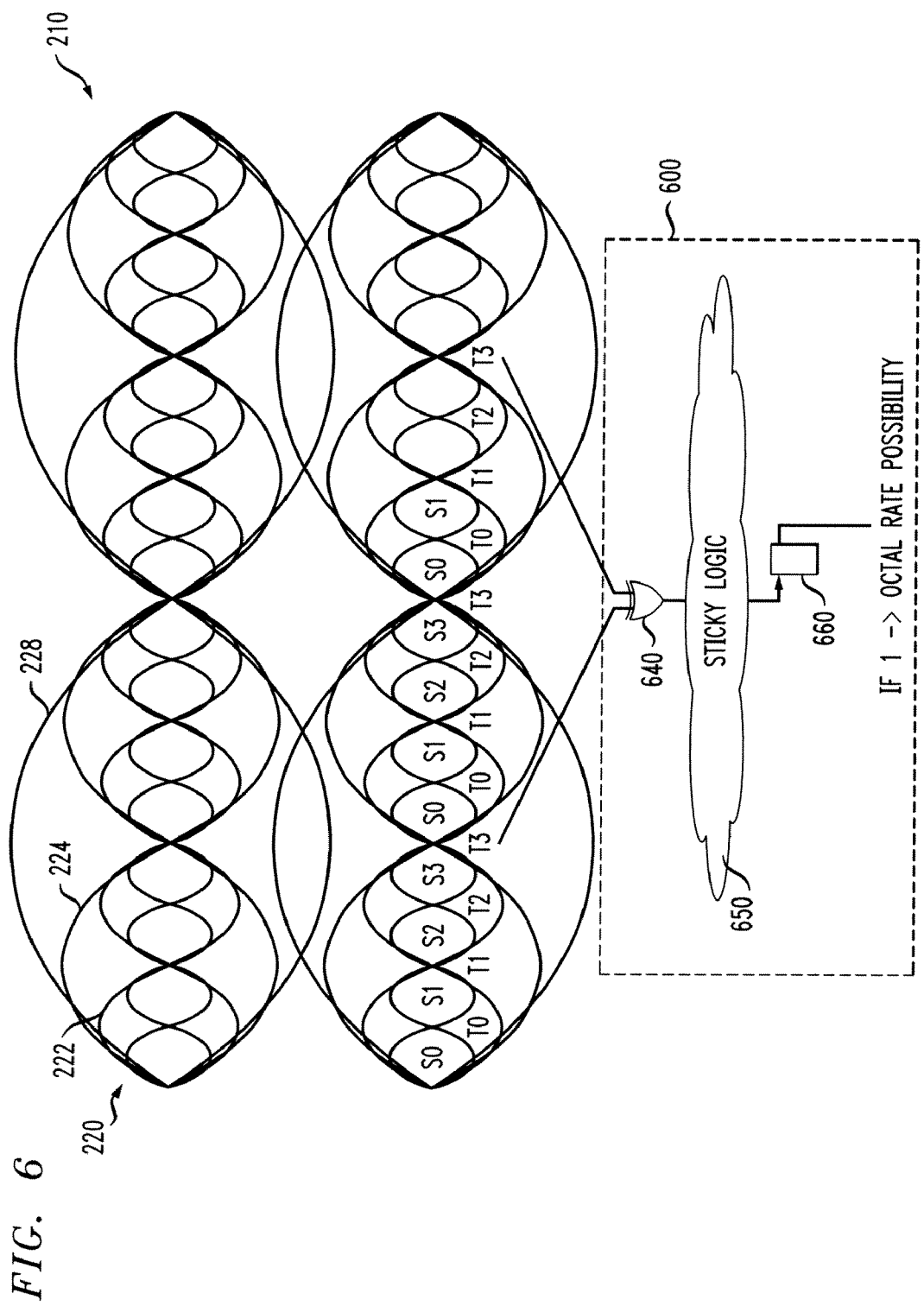
FIG. 6 is a schematic diagram of a data rate detector that incorporates features of the present invention to identify data that has been transmitted at the octal rate.

If the full, half and quarter rate detections are negative, the octal rate detector circuit 600 is evaluated. Transition of octal rate data can have eight possibilities in relation to the full data rate. Thus, there are eight possible circuit implementations. One exemplary octal rate detection circuit 600 is shown in FIG. 6. The other seven implementations would be apparent to a person of ordinary skill. If the appropriate octal rate circuit generates a logic value of one, the rate is determined to be "Octal Rate." In a further variation, a guard band or separation distance can be employed for additional flexibility and reliability, and the number of possible phase relationships is 16-M, where M is the separation distance, and the number of possible circuit implementations is 16-M.

FIG. 6 is a schematic diagram of a first octal rate detector 600 that incorporates features of the present invention to identify data that has been transmitted at the octal rate (N=8). FIG. 6 graphically illustrates the received signal 210 having a series of data eyes 220, 222, 224, 228, associated with full rate, half rate, quarter rate and octal rate, respectively. The octal rate detector 600 detects when the data has been transmitted at the octal rate, for one of the possible phase relationships.

As shown in FIG. 6, the received signal 210 is again sampled by transition latches (or sample latches, if redefined by the clock and data recovery system) between each octal rate data eye 228. For an octal rate detector 600, the outputs of every eighth latch among the latches T0 through T3 for a number of time intervals are processed to determine if there is a mismatch in the sampled values associated with the appropriate transition latches $T_n$. In the exemplary implementation, each transition latch for a given time interval is compared to the value of the same latch two time intervals later. The outputs of a given transition latch $T_n$ for every other time interval is thus applied to an exclusive OR (XOR) gate 640 to determine if there is a mismatch in the sampled values associated with the latch $T_n$. In the first octal rate detection circuit 600 shown in FIG. 6, transition latch T3 is compared to itself for every other time interval. Thus, XOR gate 640 processes the samples generated by transition latch T3 to determine if there is a mismatch in the sampled values associated with the latch T3 for alternate time intervals, such as intervals 1 and 3. The output of the XOR gate 640 will be a logic value of one if the two inputs are not the same (i.e., do not match).

The output of the XOR gate 640 is applied to corresponding sticky logic (registers) 650. As indicated above, for an octal rate signal (N=8), it is expected that every eight adjacent data eyes 220 will consistently be the same value. Thus, for an octal rate signal, it will be expected that eventually every eighth sample will not match, and at some point, the XOR gate will generate a logic value of one. Thus, the sticky register 650 associated with the XOR gate 640 will have a value of one, which is stored by an associated register 660 (or latch).

The output of the register 660 is processed by an AND gate 670. The output of the AND gate 670 will have a logic value of one if the register has a logic value of one (indicating that at some point each of the adjacent data eyes exhibited a mismatch). A "possible octal rate" condition is asserted by the data rate detector 600 whenever the output of the AND gate 670 is a logic value of one. An octal rate condition is asserted if the appropriate eight quartet rate circuit 600, based on the current phase, generates an output of one. The eight combinations compare the values of T0, T1, T2 and T3 for a first time interval to the corresponding value of T0, T1, T2 and T3 two time intervals later.

The priority of the various data rate detection circuits can be expressed in a truth table as follows:

|  | Full Rate | ½ Rate | ¼ Rate | ⅛ Rate |
| --- | --- | --- | --- | --- |
| Full Rate | 1 | 1 | 1 | 1 |
| ½ Rate | 0 | 1 | 1 | 1 |
| ¼ Rate | 0 | 0 | 1 | 1 |
| ⅛ Rate | 0 | 0 | 0 | 1 |

Thus, for example, a half rate is asserted provided that the full rate detector 200 did not generate a value of one, and the phase-appropriate half, quarter and octal detector all generated values of one.

A plurality of identical die are typically formed in a repeated pattern on a surface of the wafer. Each die includes a device described herein, and may include other structures or circuits. The individual die are cut or diced from the wafer, then packaged as an integrated to circuit. One skilled in the art would know how to dice wafers and package die to produce integrated circuits. Integrated circuits so manufactured are considered part of this invention.

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits.

It is to be understood that the embodiments and variations shown and described herein are merely illustrative of the principles of this invention and that various modifications may be implemented by those skilled in the art without departing from the scope and spirit of the invention.

We claim:

1. A method for detecting a data rate of a received signal, wherein a clock synchronization of said received signal has been acquired, wherein said data rate is one of a plurality of data rates comprising a base rate and one or more divide-by-N multiples of said base rate, and where N is an integer, said method comprising the steps of:
    obtaining a plurality of samples of said received signal;
    comparing said samples for a plurality of full rate data eyes associated with said received signal to determine if there are one or more mismatches between said plurality of samples, wherein an occurrence of said one or more mismatches indicates said data rate; and
    detecting said data rate by evaluating said occurrence of said one or more mismatches based on predefined criteria.

2. The method of claim 1, wherein said comparing step is performed for samples of at least two adjacent data eyes of a given rate.

3. The method of claim 2, wherein said comparing step is performed for samples of more than two adjacent data eyes of a given rate for additional reliability.

4. The method of claim 1, wherein said data rate is a full data rate and said comparing step determines if there is a mismatch in the sampled values associated with two adjacent full rate data eyes.

5. The method of claim 1, wherein said data rate is a half data rate and said comparing step determines if there is a mismatch in the sampled values associated with two alternate full rate equivalent data eyes.

6. The method of claim 1, wherein said data rate is a quarter data rate and said comparing step determines if there is a mismatch in the sampled values associated with full rate equivalent data eyes having a separation of four.

7. The method of claim 1, wherein said data rate is an octal data rate and said comparing step determines if there is a mismatch in the sampled values associated with full rate equivalent data eyes having a separation of eight.

8. The method of claim 1, wherein said comparing step further comprises the step of applying said samples to an exclusive or (XOR) logic gate.

9. The method of claim 1, wherein said comparing step further comprises the step of applying said samples to a logic function that detects if there is a mismatch between said at least two predefined samples.

10. A data rate detector for detecting a data rate of a received signal, wherein a clock synchronization of said received signal has been acquired, wherein said data rate is one of a plurality of data rates comprising a base rate and one or more divide-by-N multiples of said base rate, and where N is an integer, said data rate detector comprising:
    one or more latches for obtaining a plurality of samples of said received signal;
    one or more exclusive or (XOR) logic gates for comparing said samples for a plurality of full rate data eyes associated with said received signal to determine if there are one or more mismatches between said plurality of samples, wherein an occurrence of said one or more mismatches indicates said data rate; and
    a logic circuit for detecting said data rate by evaluating said occurrence of said one or more mismatches based on predefined criteria.

11. The data rate detector of claim 10, wherein said one or more XOR logic gates compares samples of at least two adjacent data eyes of a given rate.

12. The data rate detector of claim 11, wherein said one or more XOR logic gates compares samples of more than two adjacent data eyes of a given rate for additional reliability.

13. The data rate detector of claim 10, wherein said data rate is a full data rate and said one or more XOR logic gates determines if there is a mismatch in the sampled values associated with two adjacent full rate data eyes.

14. The data rate detector of claim 10, wherein said data rate is a half data rate and said one or more XOR logic gates determines if there is a mismatch in the sampled values associated with two alternate full rate equivalent data eyes.

15. The data rate detector of claim 10, wherein said data rate is a quarter data rate and said one or more XOR logic gates determines if there is a mismatch in the sampled values associated with full rate equivalent data eyes having a separation of four.

16. The data rate detector of claim 10, wherein said data rate is an octal data rate and said one or more XOR logic gates determines if there is a mismatch in the sampled values associated with full rate equivalent data eyes having a separation of eight.

17. The data rate detector of claim 10, wherein said logic circuit comprises one or more sticky registers for maintaining a predefined logic value generated by said one or more exclusive or (XOR) logic gates.

18. The data rate detector of claim 17, wherein said logic circuit comprises one or more AND rates that generates a predefined logic value if all of said sticky registers have a predefined logic value.

19. The data rate detector of claim 17, wherein once said once or more sticky registers are set to a predefined logic value at any time will maintain said predefined logic value until reset.

20. The data rate detector of claim 10, wherein said logic circuit comprises a table specifying said predefined criteria for determining said data rate.

21. The data rate detector of claim 10, wherein said data rate detector is embodied on an integrated circuit.

22. A communications receiver for receiving a received signal having a data rate that may be one of a plurality of data rates comprising a base rate and one or more divide-by-N multiples of said base rate, where N is an integer, and wherein a clock synchronization of said received signal has been acquired, said communications receiver comprising:

a data rate detector comprising:
one or more latches for obtaining a plurality of samples of said received signal;
one or more exclusive or (XOR) logic gates for comparing said samples for a plurality of full rate data eyes associated with said received signal to determine if there are one or more mismatches between said plurality of samples, wherein an occurrence of said one or more mismatches indicates said data rate; and
a logic circuit for detecting said data rate by evaluating said occurrence of said one or more mismatches based on predefined criteria.

* * * * *